United States Patent
Miyairi et al.

(10) Patent No.: US 11,035,268 B2
(45) Date of Patent: Jun. 15, 2021

(54) METHOD FOR REGENERATING EXHAUST GAS FILTER AND EXHAUST GAS FILTER IMPREGNATION SYSTEM

(71) Applicant: NGK INSULATORS, LTD., Nagoya (JP)

(72) Inventors: Yukio Miyairi, Nagoya (JP); Hiroyuki Nagaoka, Nagoya (JP); Tomoya Fujii, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/803,046

(22) Filed: Feb. 27, 2020

(65) Prior Publication Data

US 2020/0309003 A1 Oct. 1, 2020

(30) Foreign Application Priority Data

Mar. 25, 2019 (JP) .............................. JP2019-057469

(51) Int. Cl.
*F01N 3/02* (2006.01)
*F01N 3/20* (2006.01)
(Continued)

(52) U.S. Cl.
CPC ....... *F01N 3/0293* (2013.01); *B01D 46/0063* (2013.01); *B01D 46/448* (2013.01); *B01D 46/46* (2013.01); *F01N 3/022* (2013.01); *F01N 3/208* (2013.01); *F01N 3/2073* (2013.01); *B01D 2279/30* (2013.01); *F01N 2610/02* (2013.01);
(Continued)

(58) Field of Classification Search
CPC .. B01D 46/0063; B01D 46/448; B01D 46/46; B01D 2279/30; F01N 3/022; F01N 3/0293; F01N 3/2066; F01N 3/2073; F01N 3/208; F01N 9/002; F01N 2610/02; F01N 2610/261; F01N 2610/1406;
(Continued)

(56) References Cited

U.S. PATENT DOCUMENTS 9,739,187 B2 8/2017 Miyairi et al.
2013/0045139 A1* 2/2013 Boger .................... B01D 46/42
422/187

(Continued)

FOREIGN PATENT DOCUMENTS

DE 10 2011 012 567 A1 8/2012
DE 10 2015 121 003 A1 6/2016
(Continued)

OTHER PUBLICATIONS

German Office Action (Application No. 10 2020 203 715.5) dated Nov. 12, 2020 (with English translation).

*Primary Examiner* — Audrey K Bradley
(74) *Attorney, Agent, or Firm* — Burr & Brown, PLLC

(57) ABSTRACT

A method for regenerating an exhaust gas filter on which soot is deposited, including sequentially conducting: a step 1 of impregnating the filter with a liquid having 50% by mass or more of a component having a boiling point of 550° C. or less when an ambient temperature in the filter is at least 40° C. lower than the boiling point; a step 2 of raising the ambient temperature in the filter after the impregnation to a temperature equal to or higher than the boiling point of the component; and a step 3 of supplying an oxygen-containing gas at a temperature exceeding 550° C. to the filter to burn the soot.

22 Claims, 9 Drawing Sheets

(51) Int. Cl.
    *B01D 46/00*     (2006.01)
    *B01D 46/44*     (2006.01)
    *B01D 46/46*     (2006.01)
    *F01N 3/029*     (2006.01)
    *F01N 3/022*     (2006.01)

(52) U.S. Cl.
    CPC ............... *F01N 2610/1406* (2013.01); *F01N 2610/1453* (2013.01); *F01N 2900/1602* (2013.01); *F01N 2900/1811* (2013.01)

(58) Field of Classification Search
    CPC ..... F01N 2610/1453; F01N 2900/1602; F01N 2900/1811
    See application file for complete search history.

(56) References Cited

U.S. PATENT DOCUMENTS

| | | |
|---|---|---|
| 2016/0160723 A1 | 6/2016 | Thomas et al. |
| 2019/0040777 A1 | 2/2019 | Eriksson et al. |

FOREIGN PATENT DOCUMENTS

| | | |
|---|---|---|
| DE | 11 2017 000 324 T5 | 10/2018 |
| EP | 0 188 267 A1 | 7/1986 |
| JP | 2008-057333 A1 | 3/2008 |
| JP | 2010-116913 A1 | 5/2010 |
| JP | 2018-119467 A1 | 8/2018 |
| WO | 2012/089730 A1 | 7/2012 |

\* cited by examiner

METHOD FOR REGENERATING EXHAUST GAS FILTER AND EXHAUST GAS FILTER IMPREGNATION SYSTEM

FIELD OF THE INVENTION

The present invention relates to a method for regenerating an exhaust gas filter. Further, the present invention relates to an exhaust gas filter impregnation system.

BACKGROUND OF THE INVENTION

Particulate matter (hereinafter referred to as PM) in exhaust gas discharged from internal combustion engines such as diesel engines and gasoline engines includes soot. Soot is harmful to the human body and its emission is regulated. Currently, in order to comply with exhaust gas regulations, exhaust gas filters typified by DPF and GPF, which filtrate PM such as soot and the like by passing the exhaust gas through small pore partition walls having air permeability, are widely used. In such an exhaust gas filter, when soot is deposited at a certain value or more, the temperature of the exhaust gas is raised, and the filter is regenerated by flowing high-temperature exhaust gas through the filter to burn off the soot to prevent the pressure loss from becoming too large.

In the regeneration of the filter, it is necessary to burn off the soot deposited on the filter. However, it takes a long time to burn the soot, and it is necessary to use extra fuel to raise the exhaust gas temperature. Therefore, in the filter regeneration, there is a problem that the consumption of fuel for continuously raising the gas temperature becomes too much. In addition, since the temperature of the exhaust gas is high during the regeneration of the filter, ammonia is oxidized and the $NO_x$ purification efficiency by the urea SCR is greatly reduced, causing a problem that the $NO_x$ emission increases.

Further, as a method of raising the temperature of the exhaust gas, a method of performing post injection for injecting fuel into the combustion chamber after the latter stage of combustion in the combustion chamber, and burning the fuel with an oxidation catalyst prior to the exhaust gas filter to raise the gas temperature, is generally known. If the filter regeneration time is long, part of the post injection fuel mixes with the lubricating oil, diluting the lubricating oil, causing a problem that the lubricity is deteriorated and wearing of components occurs. Further, there is also a problem that the soot accumulation amount becomes maximum immediately before the regeneration, and the pressure loss becomes too much. Therefore, when generating a filter, it is desired to burn off a large amount of soot in a short time at a temperature as low as possible.

Japanese Patent Publication No. 2008-057333 (Patent Literature 1) describes a DPF regeneration processing device for a vehicle, capable of improving the effective operability of a diesel engine by shortening the automatic regeneration time of a DPF in a vehicle equipped with the diesel engine. According to this device, it is described that the temperature of the DPF is lower than before, but the concentration of oxygen introduced into the DPF increases, and moreover the exhaust gas flow rate decreases. As a result, the probability of contact between the PM on the DPF filter and the oxygen in the exhaust gas increases, and the combustion of the PM on the filter is activated, and the burning off of the PM proceeds rapidly, and the automatic regeneration time of PM can be shortened.

Japanese Patent Publication No. 2010-116913 (Patent Literature 2) discloses a filter regeneration controller for a diesel engine, characterized in that the engine operation is controlled so that the amount of nitrogen oxide emission from the diesel engine is reduced when the timing for a filter regeneration processing comes. According to the device, even during the filter regeneration control, the emission amount of nitrogen oxide $NO_x$ is not increased, and the exhaust performance is not deteriorated.

On the other hand, there is a method in which a catalyst is supported on an exhaust gas purification filter and PM is combusted by a catalytic action to reduce the PM burning operation and regenerate the filter. Japanese Patent Publication No. 2018-119467 (Patent Literature 3) describes an exhaust gas purifying device using a molten salt catalyst for the purpose of burning PM at a low temperature. The exhaust gas purifying device includes, in the exhaust flow path, an exhaust gas purifying filter that traps the PM in the exhaust gas and a filter regeneration unit that burns the PM accumulated on the exhaust gas purifying filter. The exhaust gas purifying filter includes a porous filter substrate having a plurality of cells partitioned by cell walls, and a PM combustion catalyst for burning and cleaning-up the PM. The PM combustion catalyst is a molten salt catalyst containing a composite oxide of cesium and vanadium, wherein the molar ratio of cesium to vanadium (Cs/V) is $1.0 \leq Cs/V \leq 1.5$. In the filter regeneration unit, a humidifying means and a heating means for raising the exhaust gas temperature are arranged on the upstream side of the exhaust gas purifying filter. Further, In the exhaust gas purifying device, it is described that before the PM is oxidized and burned by the PM combustion catalyst, the humidifying means adsorbs water vapor to the PM combustion catalyst on the exhaust gas purification filter.

CITATION LIST

Patent Literature

[Patent Literature 1] Japanese Patent Publication No. 2008-057333
[Patent Literature 2] Japanese Patent Publication No. 2010-116913
[Patent Literature 3] Japanese Patent Publication No. 2018-119467

SUMMARY OF THE INVENTION

As described above, although various improvements have been proposed in respect to methods for regenerating filters, the method disclosed in Japanese Patent Publication No. 2008-057333 (Patent Literature 1) still has room for improvement from the viewpoint of performing the filter regeneration in a short time with high efficiency. Further, the method disclosed in Japanese Patent Publication No. 2010-116913 (Patent literature 2) has a problem that the engine efficiency is reduced along with the reduction of $NO_x$, and it is not perfect from the viewpoint of performing the filter regeneration with high efficiency in a short time. In particular, in a DPF carrying a SCR catalyst, which is currently the mainstream of post-treatment of exhaust gas from passenger car diesels, $NO_x$ is reduced by ammonia obtained by decomposing urea on the vehicle for reduction of $NO_x$. However, when variously proposed catalysts having a strong oxidazing function are used in combination to promote soot oxidation combustion, there is a problem that ammonia is oxidized and $NO_x$ purification performance deteriorates. In view of the above circumstances, in one embodiment, an object of the present invention is to provide a method for regenerating an exhaust gas filter that is capable of efficiently regenerating the filter in a short time. Further, in another embodiment, an object of the present invention is to provide an exhaust gas filter impregnation system that is capable of efficiently regenerating the filter in a short time.

As a result of intensive studies to solve the above problems, the present inventors have found that, it is effective to burn the soot after impregnating the filter, on which soot is deposited, with a liquid having a boiling point of 550° C. or less, typically with liquid water. The present invention has been completed based on this finding, and is exemplarily shown as below.

(1)

A method for regenerating an exhaust gas filter on which soot is deposited, comprising sequentially conducting:

a step 1 of impregnating the filter with a liquid having 50% by mass or more of a component having a boiling point of 550° C. or less when an ambient temperature in the filter is at least 40° C. lower than the boiling point;

a step 2 of raising the ambient temperature in the filter after the impregnation to a temperature equal to or higher than the boiling point of the component; and a step 3 of supplying an oxygen-containing gas at a temperature exceeding 550° C. to the filter to burn the soot.

(2)

The method for regenerating an exhaust gas filter according to (1), wherein the step 1 is conducted when the ambient temperature in the filter is at least 60° C. lower than the boiling point.

(3)

The method for regenerating an exhaust gas filter according to (1) or (2), wherein the component having the boiling point of 550° C. or less is water.

(4)

The method for regenerating an exhaust gas filter according to (3), wherein the liquid comprises urea.

(5)

The method for regenerating an exhaust gas filter according to any one of (1) to (4), wherein in the step 1, an amount of the liquid impregnated in the filter is set to be 0.05 L or more and 1 L or less per 1 L of the volume of the filter.

(6)

The method for regenerating an exhaust gas filter according to any one of (1) to (5), wherein the exhaust gas filter is a vehicle exhaust gas filter.

(7)

The method for regenerating an exhaust gas filter according to (6), wherein the liquid is supplied from outside the vehicle.

(8)

The method for regenerating an exhaust gas filter according to any one of (1) to (7), wherein the exhaust gas filter comprises:

an outer peripheral side wall;

a plurality of first cells disposed inside the outer peripheral side wall, extending from a first end face to a second end face, the first end face being open and the second end face being plugged; and a plurality of second cells disposed inside the outer peripheral side wall, extending from the first end face to the second end face, the first end face being plugged and the second end face being open, and wherein the exhaust gas filter has a structure in which the first cells and the second cells are alternately arranged adjacent to each other with porous partition walls interposed therebetween.

(9)

The method for regenerating an exhaust gas filter according to any one of (1) to (8), wherein the filter does not comprise oxidation catalyst.

(10)

An exhaust gas filter impregnation system, comprising:

an exhaust gas filter placed in an exhaust gas flow path;

a supplier for supplying a liquid having 50% by mass or more of a component having a boiling point of 550° C. or less to the exhaust gas filter;

a temperature sensor placed in the exhaust gas flow path; and an automatic controller that permits the supplier to perform supply of the liquid when a temperature measured by the temperature sensor is at least 40° C. lower than the boiling point.

(11)

The exhaust gas filter impregnation system according to (10), wherein the supplier is capable of directly injecting the liquid toward the exhaust gas filter.

(12)

The exhaust gas filter impregnation system according to (10), wherein the exhaust gas filter is placed in a liquid reservoir provided in the exhaust gas flow path, and the supplier is capable of supplying the liquid to the liquid reservoir.

(13)

The exhaust gas filter impregnation system according to any one of (10) to (12), wherein the supplier is provided on an upstream side of the exhaust gas filter.

(14)

The exhaust gas filter impregnation system according to any one of (10) to (13), wherein the supplier supplies the liquid at a downstream of an oxidation catalyst provided in the exhaust gas flow path.

(15)

The exhaust gas filter impregnation system according to any one of (10) to (14), wherein the automatic controller permits the supplier to perform supply of the liquid when a temperature measured by the temperature sensor is at least 60° C. lower than the boiling point.

(16)

The exhaust gas filter impregnation system according to any one of (10) to (15), wherein the component having the boiling point of 550° C. or less is water.

(17)

The exhaust gas filter impregnation system according to any one of (10) to (16), wherein the liquid comprises urea.

(18)

The exhaust gas filter impregnation system according to any one of (10) to (17), wherein the automatic controller is capable of giving instruction to the supplier to quantitatively supply an amount of the liquid of 0.05 L or more and 1 L or less per 1 L of the volume of the filter.

(19)

The exhaust gas filter impregnation system according to any one of (10) to (18), wherein the exhaust gas filter is a vehicle exhaust gas filter.

(20)

The exhaust gas filter impregnation system according to any one of (10) to (19), wherein the exhaust gas filter comprises:

an outer peripheral side wall;

a plurality of first cells disposed inside the outer peripheral side wall, extending from a first end face to a second end face, the first end face being open and the second end face being plugged; and a plurality of second cells disposed inside the outer peripheral side wall, extending from the first end face to the second end face, the first end face being plugged and the second end face being open, and wherein the exhaust gas filter has a structure in which the first cells and the second cells are alternately arranged adjacent to each other with porous partition walls interposed therebetween.

(21)

The exhaust gas filter impregnation system according to any one of (10) to (20), wherein the filter does not comprise oxidation catalyst.

(22)

The exhaust gas filter impregnation system according to any one of (10) to (21), wherein the supplier comprises a water tank for collecting and storing liquid water generated by condensation of water vapor in the exhaust gas.

(23)

The exhaust gas filter impregnation system according to any one of (10) to (22), wherein the exhaust gas filter impregnation system is mounted on a vehicle, and comprises a connection portion for supplying the liquid to the supplier from outside the vehicle.

According to one embodiment of the present invention, since soot combustion is promoted, it is possible to efficiently carry out filter regeneration in a short time even at a low temperature. As a result, according to one embodiment of the present invention, various benefits can be obtained such as reduction of fuel consumption required for the soot combustion, suppression of dilution of lubricating oil by the fuel, and suppression of reduction of $NO_x$ purification efficiency. Accordingly, in one embodiment, the present invention provides a breakthrough technological advance in filter regeneration technology, and has extremely high industrial utility value.

BRIEF DESCRIPTION OF THE DRAWINGS

FIG. 8-1 is a schematic view of a first example of an exhaust system having an exhaust gas filter impregnation system according to the present invention.

FIG. 8-2 is a schematic view of a second example of an exhaust system having an exhaust gas filter impregnation system according to the present invention.

FIG. 8-3 is a schematic view of a third example of an exhaust system having an exhaust gas filter impregnation system according to the present invention.

FIG. 8-4 is a schematic view of a fourth example of an exhaust system having an exhaust gas filter impregnation system according to the present invention.

FIG. 8-5 is a schematic view of a fifth example of an exhaust system having an exhaust gas filter impregnation system according to the present invention.

FIG. 8-6 is a schematic view of a sixth example of an exhaust system having an exhaust gas filter impregnation system according to the present invention.

FIG. 8-7 is a schematic view of a seventh example of an exhaust system having an exhaust gas filter impregnation system according to the present invention.

FIG. 8-8 is a schematic view of an eighth example of an exhaust system having an exhaust gas filter impregnation system according to the present invention.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

(1. Exhaust Gas Filter)

The filter that can be used in the method for regenerating an exhaust gas filter and the exhaust gas filter impregnation system according to the present invention is not particularly limited as long as it has a structure capable of collecting soot in exhaust gas. Typical exhaust gas filters may be exemplified such as a DPF (Diesel Particulate Filter) and a GPF (Gasoline Particulate Filter), which are attached to an exhaust gas line from a combustion, typically an engine mounted on a vehicle, for collecting soot. In one embodiment, the DPF and the GPF comprise a pillar-shaped honeycomb structure which has a plurality of first cells extending from a first end face to a second end face, the first end face being open and the second end face being plugged, and a plurality of second cells adjacent to at least one first cell via a porous partition walls, the second cells extending from the first end face to the second end face, the first end face being plugged and the second end face being open. The honeycomb filter having such an alternating plugging structure is generally called a wall flow type filter.

Figure 1:
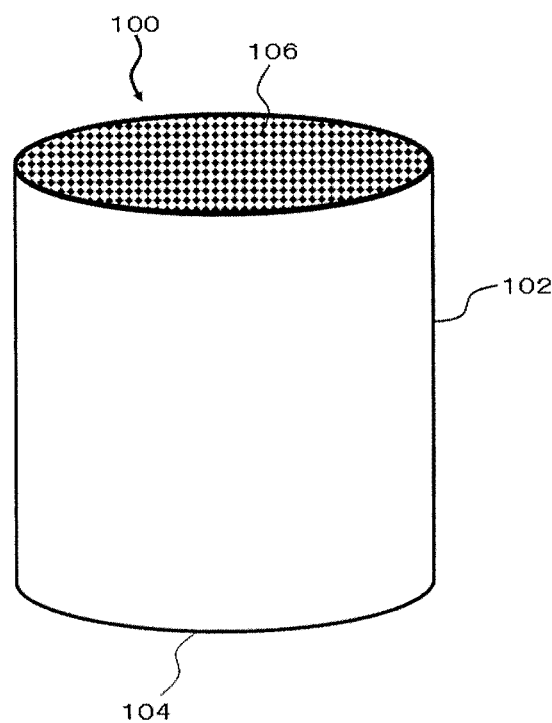
FIG. 1 is a perspective view schematically showing a DPF as an example of an exhaust gas filter.
Figure 2:
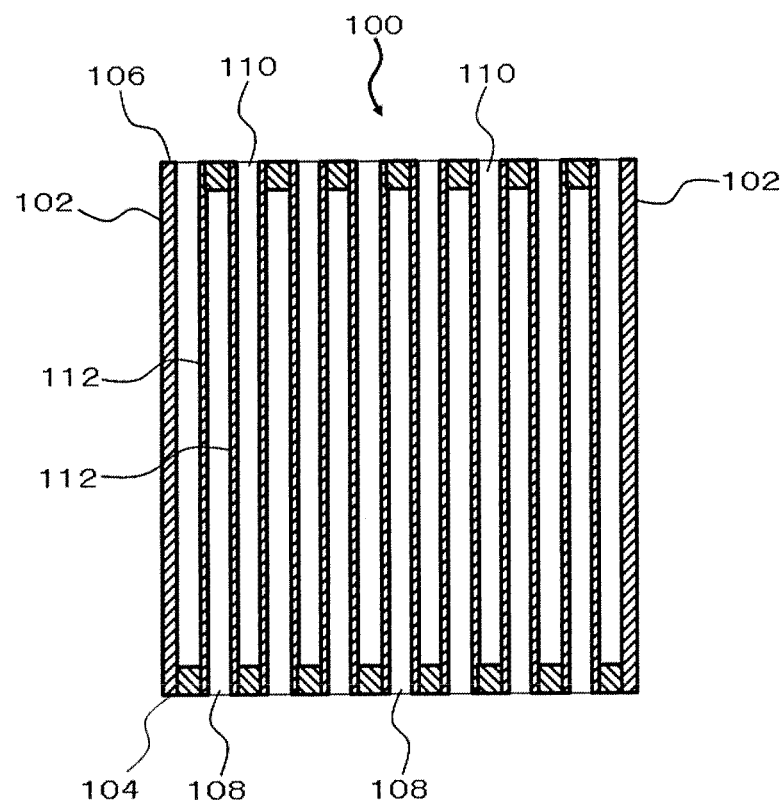
FIG. 2 is a schematic cross-sectional view when a DPF, which is an example of an exhaust gas filter, is observed from a direction orthogonal to the direction in which the cells extend.

FIG. 1 shows a perspective view schematically showing a DPF as an example of an exhaust gas filter. FIG. 2 shows a schematic cross-sectional view when a DPF is observed from a direction orthogonal to the direction in which the cells extend. The illustrated exhaust gas filter 100 comprises an outer peripheral side wall 102; a plurality of first cells 108 disposed inside the outer peripheral side wall 102, extending from a first end face 104 to a second end face 106, the first end face 104 being open and the second end face 106 being plugged; and a plurality of second cells 110 disposed inside the outer peripheral side wall 102, extending from the first end 104 face to the second end face 106, the first end face 104 being plugged and the second end face 106 being open. Further, the illustrated exhaust gas filter 100 comprises porous partition walls 112 that section and define the first cells 108 and the second cells 110, the first cells 108 and the second cells 110 are alternately arranged adjacent to each other with the partition walls 112 interposed therebetween.

When exhaust gas containing soot is supplied to the first end face 104 on the upstream side of the exhaust gas filter 100, the exhaust gas is introduced into the first cells 108 and proceeds downstream in the first cells 108. In the first cells 108, the second end face 106 on the downstream side is plugged, so that the exhaust gas flows through the porous partition walls 112 that section the first cells 108 and the second cells 110 and flows into the second cells 110. Since soot cannot pass through the partition walls 112, it is collected and deposited in the first cells 108. After the soot is removed, the clean exhaust gas that has flowed into the second cells 110 proceeds downstream in the second cells 110 and flows out from the second end face 106 on the downstream side.

The material of the exhaust gas filter 100 is not limited, and porous ceramics may be exemplified. Examples of ceramics include cordierite, mullite, zirconium phosphate, aluminum titanate, silicon carbide, silicon-silicon carbide composite, cordierite-silicon carbide composite, zirconia, spinel, indialite, saphirin, corundum, titania and the like. In addition, these ceramics may contain one kind alone, or may contain two or more kinds at the same time. As another material of the exhaust gas filter 100, a porous sintered metal or the like comprising an alloy component having as a main component one or two or more selected from the group consisting of Fe, Cr, Mo, and Ni, can be used. Further, as another embodiment of the exhaust gas filter, an embodiment in which a layer made of ceramic fibers or metal fibers is used as a filter layer can be exemplified.

The exhaust gas filter 100 may carry an appropriate catalyst depending on its application. Examples of the catalyst include, but are not limited to, an oxidation catalyst (DOC) for oxidizing and burning hydrocarbons (HC) and carbon monoxide (CO) to increase the exhaust gas temperature, a PM combustion catalyst assisting the combustion of PM such as soot, an SCR catalyst and an NSR catalyst for removing nitrogen oxides ($NO_x$), and a three way catalyst capable of simultaneously removing hydrocarbons (HC), carbon monoxide (CO) and nitrogen oxides ($NO_x$). Catalysts may appropriately contain, for example, noble metals (Pt, Pd, Rh, etc.), alkali metals (Li, Na, K, Cs, etc.), alkaline earth metals (Ca, Ba, Sr, etc.), rare earths (Ce, Sm, Gd, Nd, Y, Zr, Ca, La, Pr, etc.), transition metals (Mn, Fe, Co, Ni, Cu, Zn, Sc, Ti, V, Cr, etc.) and the like.

In particular, in a DPF for a passenger car, Cu-substituted zeolite, Fe-substituted zeolite, and the like are carried on the DPF in order to simultaneously have soot collection and $NO_x$ purification functions. In this case, $NO_x$ purification by ammonia obtained by decomposing urea on the vehicle is performed. However, a catalyst with an oxidizing function that promotes the oxidation of ammonia is unfortunately an obstacle to $NO_x$ purification, and thus catalysts with strong oxidation functions such as noble metals and alkali metals cannot be simultaneously carried, so the catalyst cannot be relied on to improve the soot regeneration efficiency.

Further, the exhaust gas filter 100 may not carry a catalyst. Therefore, the exhaust gas filter 100 does not carry an oxidation catalyst in one embodiment, and does not carry a PM combustion catalyst in another embodiment, and does not carry an SCR catalyst in yet another embodiment, and does not carry a three way catalyst in yet another embodiment, and does not carry any of an oxidation catalyst, a PM combustion catalyst, an SCR catalyst, or a three way catalyst in yet another embodiment. According to one embodiment of the method for regenerating an exhaust gas filter according to the present invention, the soot combustion promoting effect is so great that the soot can be burned off highly efficiently at a low temperature and in a short time without carrying a PM combustion catalyst.

(2. Method for Regenerating Exhaust Gas Filter)

If the exhaust gas filter continues to be used, soot will gradually accumulate inside the exhaust gas filter and increase the pressure loss. Therefore, when soot is deposited at a certain value or more, it is necessary to remove the soot to regenerate the exhaust gas filter. As a method for removing soot, a method is generally adopted in which after raising the temperature of the exhaust gas, a high-temperature exhaust gas is caused to flow through the exhaust gas filter to remove the soot by combustion.

The ignition temperature of soot is high, and in order to burn soot deposited on the exhaust gas filter, it is generally necessary to burn the soot in the presence of an oxygen-containing gas heated to a temperature exceeding 550° C. A higher heating temperature is preferable from the viewpoint of promoting soot combustion, but increasing the heating temperature causes problems such as an increase in fuel consumption, an increase in $NO_x$ emission, and dilution of lubricating oil. Therefore, it is desirable that soot can be burned off efficiently at a temperature as low as possible and in a time as short as possible even at a temperature exceeding 550° C.

The soot deposited on the exhaust gas filter often adheres strongly to the exhaust gas filter in a layered manner, and it is not easy to burn off the soot fixed inside the soot deposition layer. For this reason, at about 550° C., it is ordinary that a sufficient soot removal rate cannot be obtained in a short time. However, according to the research results of the present inventors, it is found that, when the soot is burned after a process of impregnating the exhaust gas filter inside which soot is deposited with water and vaporizing the water, soot combustion is significantly promoted, and thus excellent soot removal efficiency can be obtained even at around 550° C.

While not intending to limit the invention by any theory, the presumed principle by which the soot combustion is promoted is described below with reference to FIG. 3. Soot is not initially deposited on the partition walls 112 of the gas filter (a). However, as the exhaust gas filter continues to be used, the soot 120 gradually accumulates in layers on the partition walls 112 (b). When the exhaust gas filter 100 on which the soot 120 is deposited is impregnated with water, the water that has permeated the deposited layer of the soot 120 is condensed to form a large number of pores 122 (c). Thereby, the passage resistance when flowing the soot-regenerating oxygen-containing gas through the soot deposition layer in step 3 is reduced. The pressure loss can be significantly reduced even in the state where a large amount of soot is accumulated immediately before the filter regeneration, so that the deterioration of fuel efficiency due to the pressure loss can be suppressed.

Thereafter, the water is vaporized (particularly boiled) by heating the exhaust gas filter to a temperature higher than the boiling point of water. Due to the volume expansion upon water evaporation, the deposited layer of soot 120 is broken from the inside and the soot 120 is dispersed (d). Some soot floats or scatters from the filter. As a result, the soot is thermally isolated from the partition walls, that is, the heat transfer path from the soot to the partition walls is cut off, so that the soot is in a state in which it is generally easy to be heated. In addition, the high-temperature gas can easily access the entire soot deposited on the exhaust gas filter, and the contact probability increases. For this reason, soot can be efficiently burned off in a short time despite the low heating temperature. In addition, as to the water, it is considered that high-temperature steam reacts with soot to locally generate hydrogen ($H_2$) and/or carbon monoxide (CO), and the reaction also contributes to soot removal. It is considered that the principle is not limited to water, but is similarly established for other liquid components. Further, Japanese Patent Publication 2018-119467 (Patent Literature 3) describes that an exhaust gas filter is humidified. However, even if water vapor, which is already gas, is adhered to an exhaust gas filter, the above-described effect cannot be obtained.

Therefore, according to one embodiment of the present invention, there is provided a method for regenerating an exhaust gas filter in which soot is deposited comprising sequentially conducting:

a step 1 of impregnating the filter with a liquid having 50% by mass or more of a component having a boiling point of 550° C. or less when an ambient temperature in the filter is at least 40° C. lower than the boiling point;

a step 2 of raising the ambient temperature in the filter after the impregnation to a temperature equal to or higher than the boiling point of the component; and a step 3 of supplying an oxygen-containing gas at a temperature exceeding 550° C. to the filter to burn the soot.

<Step 1>

In step 1, the filter is impregnated with a liquid having 50% by mass or more of a component having a boiling point of 550° C. or less (Hereinafter also referred to as "impregnating liquid") when an ambient temperature in the filter is at least 40° C. lower than the boiling point.

By impregnating the exhaust gas filter with a liquid having 50% by mass or more of a component having a boiling point of 550° C. or less (impregnating liquid), the component can be boiled before reaching the temperature at which soot combustion is performed. Therefore, the breakage of the soot deposition layer described above can be caused. From the viewpoint of promoting the breakage of the soot deposition layer, the content of the component having a boiling point of 550° C. or less contained in the impregnating liquid is preferably 60% by mass or more, and more preferably 80% by mass or more, and still more preferably 90% by mass or more.

From the viewpoint of enhancing rapid evaporation and increasing the effect, the component having a boiling point of 550° C. or less preferably has a boiling point of 500° C. or less, more preferably has a boiling point of 400° C. or less, still more preferably has a boiling point of 300° C. or less, and most preferably has a boiling point of 200° C. or less. Further, because a liquid at room temperature makes it easier to perform step 1, the component having a boiling point of 550° C. or less preferably has a melting point of 20° C. or less, and more preferably 10° C. or less.

Specific examples of the component having a boiling point of 550° C. or less include, but are not limited to, water and hydrocarbons having 5 to 30, particularly 6 to 16 carbon atoms (typically alkanes). These components may be used alone or in combination of two or more. Among these, water is preferred from the viewpoint of ease of handling and cost.

Specific examples of the liquid having 50% by mass or more of a component having a boiling point of 550° C. or less (impregnating liquid) include water, an aqueous solution, and oil (for example, gasoline, kerosene, light oil, heavy oil, engine oil, and the like). The impregnating liquid may be used one kind alone or in combination of two or more kinds. Among these, water and aqueous solution are preferred because they are easy to handle and inexpensive. In addition, generally, urea water is often used to reduce $NO_x$ in exhaust gas from an engine. Therefore, using urea water, which is an aqueous solution of urea, as the impregnating liquid is convenient because it is not necessary to newly provide a liquid supply source.

Considering that a component having a boiling point of 550° C. or less is boiled in the next step, it is necessary that the ambient temperature in the filter when impregnating the exhaust gas filter with the impregnating liquid is lower than the boiling point of the component. However, if the ambient temperature in the filter when impregnating the exhaust gas filter with the impregnating liquid is too close to the boiling point of the component even if it is lower than the boiling point of the component, the component cannot be sufficiently impregnated into the soot deposition layer before the component penetrates sufficiently because of evaporation of the component, and the effect of breaking the soot deposition layer cannot be sufficiently obtained. Therefore, when the exhaust gas filter is impregnated with the impregnating liquid, the ambient temperature in the filter is at least 40° C. lower, preferably at least 50° C. lower, and more preferably at least 60° C. lower than the boiling point of the component having a boiling point of 550° C. or less.

For example, when water is used as a component having a boiling point of 550° C. or less, the ambient temperature in the exhaust gas filter when impregnating water is preferably 60° C. or less, and more preferably 50° C. or less, and still more preferably 40° C. or less. Generally, when the engine starts, the exhaust gas temperature reaches several hundred degrees in several tens of seconds. Therefore, in the case where water is used as a component having a boiling point of 550° C. or less, step 1 is usually performed when the engine is stopped or immediately after the engine is started.

From the viewpoint of promoting the breakage of the soot deposition layer, the impregnation amount of the impregnating liquid with which the exhaust gas filter is impregnated is preferably 0.05 L or more, more preferably 0.08 L or more, and still more preferably 0.1 L or more, per 1 L of the volume of the filter. Further, since the effect will be saturated and the cost increases even if the amount is excessively large, the impregnation amount of the impregnating liquid with which the exhaust gas filter is impregnated is preferably 1 L or less, more preferably 0.6 L or less, and still more preferably 0.2 L or less per 1 L of the volume of the filter. It is noted that the volume of the filter here is a value calculated from the outer dimensions of the filter, and pores and cells existing inside are also included in the volume.

In order to sufficiently impregnate the exhaust gas filter with the impregnating liquid, after supplying the required amount of the impregnating liquid to the exhaust gas filter, the waiting time before starting raising the temperature in step 2 is preferably 0.5 minutes or more, more preferably 2 minutes or more, and still more preferably 5 minutes or more. On the other hand, if the waiting time is too long, the impregnating liquid may evaporate and disappear. Therefore, after supplying the required amount of the impregnating liquid to the exhaust gas filter, the waiting time before shifting to step 2 is 900 minutes or less, more preferably 600 minutes or less, and still more preferably 300 minutes or less. After the driving is finished on the previous day, the filter may be immersed in water so that a timing such as at the start of driving the next morning is possible to perform regeneration. If the impregnating liquid, such as light oil, does not evaporate at normal temperature, there is no problem even if a longer waiting time is set. For example, impregnation may be performed after the end of the driving on the weekend, and regeneration may be performed at the start of the driving at the beginning of the next week.

When the exhaust gas filter is for a vehicle, the impregnating liquid may be supplied each time from outside the vehicle, or alternatively, a storage tank for the impregnating liquid may be provided on the vehicle and the impregnating liquid may be supplied from it. However, the frequency of regeneration of the exhaust gas filter is not so high (about once every five days), and in commercial vehicles such as trucks and buses, it is customary to stop the vehicle at a predetermined place before regenerating the filter. In view of these points, it is preferable from the viewpoint of cost to supply the impregnating liquid from outside the vehicle each time the filter is regenerated without installing a storage tank for the impregnating liquid.

The method of impregnating the exhaust gas filter with the impregnating liquid may be, but not limited to a method of directly injecting the impregnating liquid toward the exhaust gas filter or a method of immersing the exhaust gas filter in the impregnating liquid. In both the former method and the latter method, the impregnating liquid permeates or is sucked up by means of capillary phenomenon and spreads over the entire exhaust gas filter, so it is not necessary to spray the impregnating liquid throughout the exhaust gas filter or to immerse the whole exhaust gas filter with the impregnating liquid. Instead, it may be sprayed or immersed partially.

<Step 2>

In step 2, the temperature of the atmosphere in the filter after the impregnation is raised to the temperature that is equal or greater than the boiling point of the component having a boiling point of 550° C. or less. By passing through the process, the component is vaporized and expanded in volume, so that the breakage of the soot deposition layer is promoted based on the above-described estimated principle. Here, when the impregnating liquid contains a plurality of types of components having a boiling point of 550° C. or less, the boiling point can be a value with a certain range. However, for the sake of simplicity, the boiling point of the component (solvent) having the largest volume ratio in the impregnating liquid among the plurality of components having a boiling point of 550° C. or less is defined as "the boiling point of the component having a boiling point of 550° C. or less".

The method of raising the ambient temperature in the exhaust gas filter is not particularly limited. However, in the case of an exhaust gas filter for a vehicle, an operation of raising the temperature of the exhaust gas from the engine using an oxidation catalyst or the like for regeneration of the filter is performed, so it is convenient to raise the temperature by this operation.

<Step 3>

In step 3, an oxygen-containing gas at a temperature exceeding 550° C. is supplied to the exhaust gas filter to burn the soot. In order to reduce fuel consumption, the oxygen-containing gas preferably has a temperature as low as possible while exceeding 550° C. Therefore, the temperature of the oxygen-containing gas is preferably at 650° C. or less, more preferably 600° C. or less, still more preferably 570° C. or less. As described above, since the combustion of soot deposited on the exhaust gas filter is promoted by passing through step 1, it is possible to burn off the soot in a short time and efficiently even at such a low temperature.

From the viewpoint of quickly burning off the soot from the exhaust gas filter, the oxygen concentration in the oxygen-containing gas is preferably 2% by volume or more, more preferably 3% by volume or more, and still more preferably 5% by volume or more. Further, the oxygen concentration in the oxygen-containing gas is not particularly limited, but considering the case of using both fuel combustion and electric heating, the maximum is 21% by volume in the case of electric heating only. Since electric power consumption by electric heating is not preferable, when exhaust gas is heated only by combustion, in the case of heating the exhaust gas only by combustion, the volume is necessarily 15% by volume or less due to the consumption of oxygen by combustion necessary for heating to 550° C. or higher.

The type of the oxygen-containing gas is not particularly limited, and air may be used. However, in the case of an exhaust gas filter for a vehicle, it is generally exhaust gas from an engine. In a typical embodiment, as an oxygen-containing gas, the exhaust gas after passing through an oxidation catalyst for a diesel engine or a three-way catalyst for a gasoline engine is used.

According to one embodiment of the present invention, the time for supplying the oxygen-containing gas at a temperature exceeding 550° C. to the exhaust gas filter may be 10 minutes or less, preferably 8 minutes or less, and more preferably 5 minutes or less. Further, according to one embodiment of the present invention, even when the oxygen-containing gas is supplied for such a short time to burn soot, 90% or more, preferably 95% or more, more preferably 99% or more of a regeneration efficiency can be achieved. Here, the regeneration efficiency η (%) is represented by the following equation.

$$\eta = (m_1 - m_2)/m_1 \times 100 (\%)$$

η: regeneration efficiency
$m_1$: PM deposition weight before regeneration
$m_2$: PM deposition weight after regeneration In addition, since PM other than soot is also trapped in the exhaust gas filter, when calculating the regeneration efficiency, calculation is performed including PM other than soot as well. Further, the above-mentioned $m_1$ and $m_2$ are measured to obtain the regeneration efficiency by measuring the weight $MF_1$ of the filter on which soot is not deposited, the filter weight $MF_2$ on which soot is deposited before regeneration, and the filter weight $MF_3$ after regeneration, respectively, under a dried condition after drying at 200° C. for 1 hour or more and evaporating the water in the catalyst. The calculation is:

$$m_1 = MF_2 - MF_1$$

$$m_2 = MF_3 - MF_1$$

(3. Exhaust Gas Filter Impregnation System)

According to one embodiment of the present invention, there is provided an exhaust gas filter impregnation system suitable for performing the above-described method for renegerating an exhaust gas filter.

In one embodiment, the exhaust gas filter impregnation system comprises:

an exhaust gas filter placed in an exhaust gas flow path;

a supplier for supplying a liquid having 50% by mass or more of a component having a boiling point of 550° C. or less to the exhaust gas filter;

a temperature sensor placed in the exhaust gas flow path; and an automatic controller that permits the supplier to perform supply of the liquid when a temperature measured by the temperature sensor is at least 40° C. lower than the boiling point.

As the exhaust gas filter, the exhaust gas filter described in the above-described item "1. Exhaust Gas Filter" can be used. According to an exemplary embodiment, DPF is used to purify exhaust gas from a diesel engine, and GPF is used to purify exhaust gas from a gasoline engine. Further, the liquid having 50% by mass or more of a component having a boiling point of 550° C. or less (the impregnating liquid) is as described in the above-mentioned "2. Method for Regenerating an Exhaust Gas Filter", and typically water or aqueous solution can be suitably used.

The supplier may comprise an impregnating liquid pipe connected to a supply source (for example, a storage tank) of the impregnating liquid mounted on or outside the vehicle, and a discharge port. The impregnating liquid passes through the impregnating liquid pipe and is discharged from the supply port. A nozzle may not be provided at the tip of the impregnating liquid pipe, but for the purpose of increasing the discharge pressure and/or controlling the discharge direction, a nozzle such as a spray nozzle may be attached to the tip of the impregnating liquid pipe, and the discharge port may be provided at the nozzle tip. The discharge pressure is not particularly limited, but may be, for example, 0.15 MPa to 2.0 MPa, typically 0.2 MPa to 0.5 MPa. If necessary, a pump or pumps may be installed in the impregnating liquid pipe, so that the discharge pressure can be increased.

When a storage tank for the impregnating liquid is provided on the vehicle, the impregnating liquid can be supplied to the storage tank from outside the vehicle in advance. Also, at a position where the temperature of the exhaust gas at the lowermost stream of the exhaust system is low, the water vapor contained in the exhaust gas is condensed and liquefied, and accumulates in the exhaust gas flow path. Therefore, the liquid water may be collected by a drain pipe and stored in the storage tank on the vehicle. There is no need to separately secure water from outside the vehicle, and water generated by burning fuel can be used.

Further, in order to actively cool the exhaust gas, cooling fins (to increase the area to facilitate cooling) may be provided outside the exhaust pipe. Further, as described in U.S. Pat. No. 9,739,187 B2, the exhaust gas may be actively cooled with a cooler or the like and a water tank may be provided for collecting water in the exhaust gas.

For the reason of shortening the time, the supply flow rate of the impregnating liquid from the supplier is preferably 5 cc/sec or more, more preferably 10 cc/sec or more, and still more preferably 30 cc/sec or more. In addition, from the viewpoint of reducing the size and cost of the device and pipe(s), the supply flow rate of the impregnating liquid from the supplier is preferably 200 cc/sec or less, more preferably 150 cc/sec or less, and still more preferably 100 cc/sec or less. The supply flow rate of the impregnating liquid from the supplier can be controlled by a flow controller such as a mass flow controller.

Figure 4:
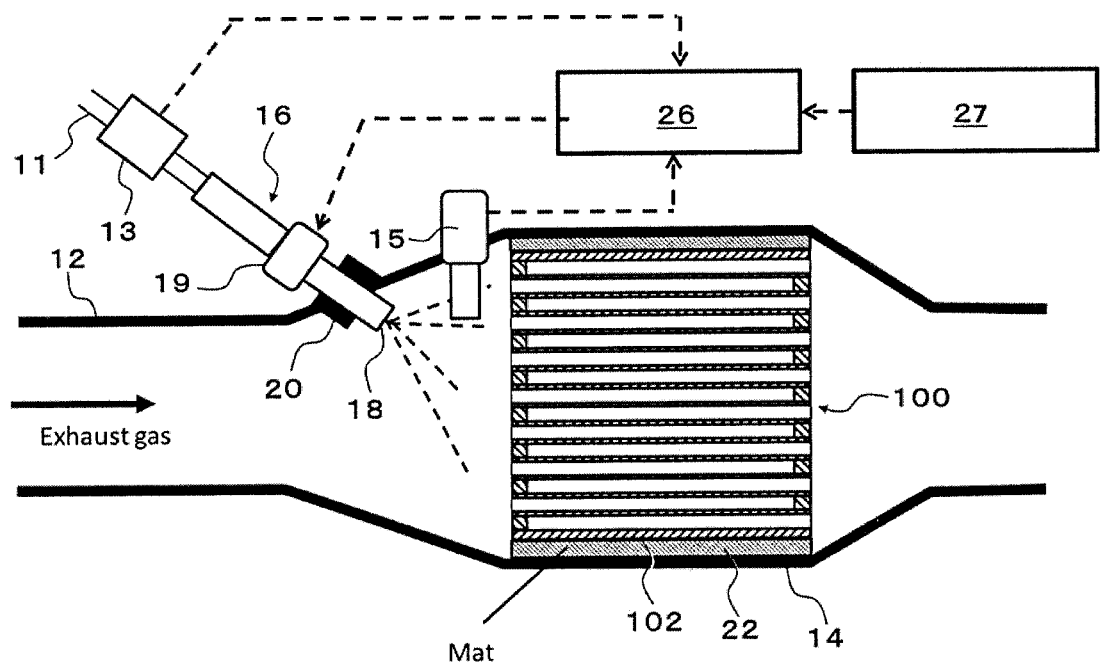
FIG. 4 is a schematic diagram showing an arrangement example of a liquid supplier for an exhaust gas filter.

FIG. 4 is a schematic diagram showing an example of the arrangement of the supplier of the impregnating liquid with respect to the exhaust gas filter. In the present embodiment, a pillar-shaped exhaust gas filter 100 having a honeycomb structure is canned in an enlarged diameter portion 14 provided in the exhaust gas flow path 12 and having a large flow path cross-sectional area. The impregnating liquid supplier 16 has an impregnating liquid pipe 11, a nozzle 20, and a discharge port 18. The impregnating liquid is discharged from the discharge port 18 provided at the tip of the nozzle 20 through the impregnating liquid pipe 11. In the present embodiment, the impregnating liquid supplier 16 is arranged at a position and in a direction such that the impregnating liquid can be directly injected toward the exhaust gas filter 100. A mat 22 made of ceramic fiber or metal fiber may be interposed between the outer peripheral side wall of the exhaust gas filter 100 and the inner wall of the exhaust gas flow path 12 so that no gap is formed between them.

The location of the exhaust gas filter that directly injects the impregnating liquid is not particularly limited. However, the upstream end face or the downstream end face of the exhaust gas filter is preferable because the impregnating liquid can be supplied over a wide range in the filter cross-sectional direction (direction perpendicular to the exhaust gas flow direction). The upstream end face of the exhaust gas filter is preferable because the effect of the present invention can be enhanced at the filter inlet side at the time of regeneration, thereby promoting downstream regeneration. The exhaust gas filter 100 is impregnated with the impregnating liquid ejected from the supplier 16. Since the impregnating liquid sprayed on the upstream end face or the downstream end face permeates the entire exhaust gas filter by capillary phenomenon, it is possible to impregnate the entire exhaust gas filter with the impregnating liquid.

Figure 5:
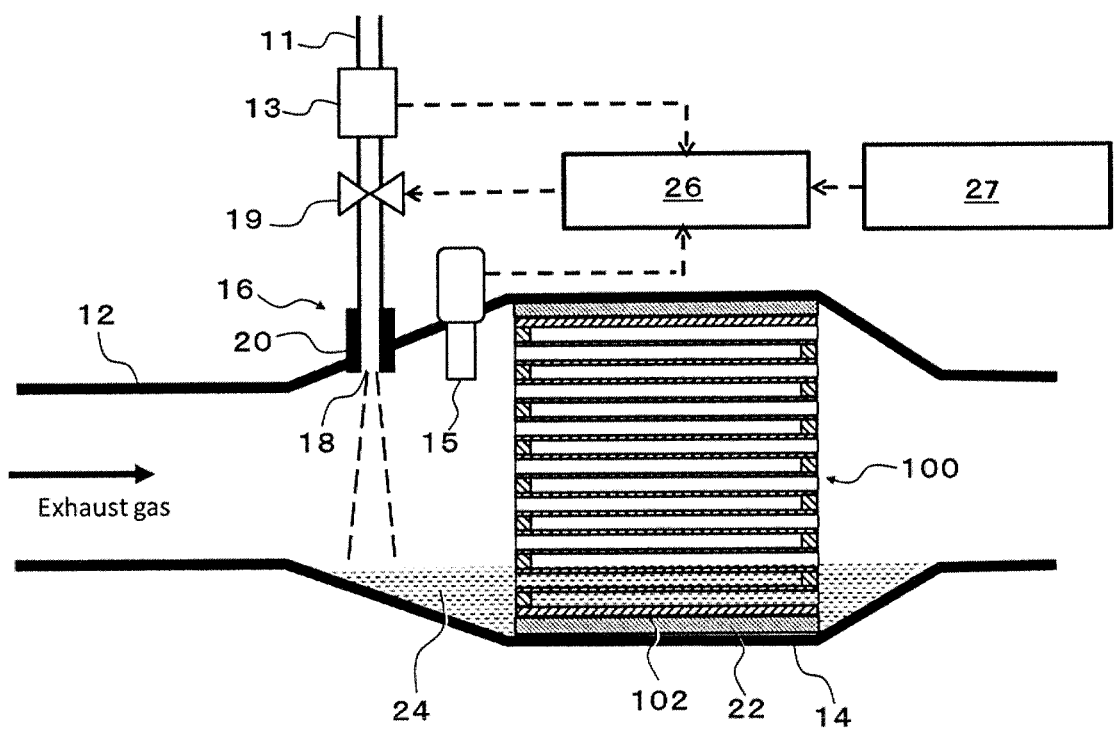
FIG. 5 is a schematic diagram showing another arrangement example of a liquid supplier for an exhaust gas filter.

Next, FIG. 5 is a schematic diagram showing another arrangement example of the impregnating liquid supplier for the exhaust gas filter. In the present embodiment, a pillar-shaped exhaust gas filter 100 having a honeycomb structure is canned in an enlarged diameter portion 14 provided in the exhaust gas flow path 12 and having a large flow path cross-sectional area. The impregnating liquid supplier 16 has an impregnating liquid pipe 11, a nozzle 20, and a discharge port 18. The impregnating liquid is discharged from the discharge port 18 provided at the tip of the nozzle 20 through the impregnating liquid pipe 11. The discharge port 18 provided at the tip of the nozzle 20 faces the bottom of the enlarged diameter portion 14. The bottom of the enlarged diameter portion 14 can function as a liquid reservoir 24 that stores the impregnating liquid discharged from the supplier 16. Since the impregnating liquid accumulated in the liquid reservoir 24 can be sucked up by capillary phenomenon, it is possible to impregnate the entire exhaust gas filter with the liquid.

The supplier 16 can include an automatic valve 19 such as an electromagnetic valve or an electric valve, and can be configured to be able to control opening and closing of the valve according to an opening signal from the automatic controller 26. Further, the supplier 16 can be configured to control not only the opening and closing of the valve but also the opening degree of the valve in accordance with the opening degree signal from the automatic controller 26. The automatic controller 26 is configured to be able to receive a filter regeneration request from an onboard determination system 27 that determines the necessity of filter regeneration.

The temperature sensor 15 is installed in the exhaust gas flow path 12 and can measure the ambient temperature in the exhaust gas flow path 12. Although the place where the temperature sensor 15 is installed is not limited, it is preferable to install the temperature sensor 15 near the exhaust gas filter 100 from the viewpoint of increasing control accuracy. Specifically, a position within 30 cm, preferably within 20 cm, more preferably within 10 cm from the upstream end face of the exhaust gas filter in the upstream direction of the exhaust gas flow is desirable, or alternatively, a position within 30 cm, preferably within 20 cm, more preferably within 10 cm from the downstream end face of the exhaust gas filter in the downstream direction of the exhaust gas flow is desirable to install the temperature sensor. Furthermore, it is possible to insert a temperature sensor into the exhaust gas filter.

The automatic controller 26 can be configured to permit the supplier 16 to perform supply of the impregnating liquid when a temperature measured by the temperature sensor 15 is at least 40° C. lower, preferably at least 50° C. lower, more preferably at least 60° C. lower than the boiling point of the component having the boiling point of 550° C. or less.

Figure 6:
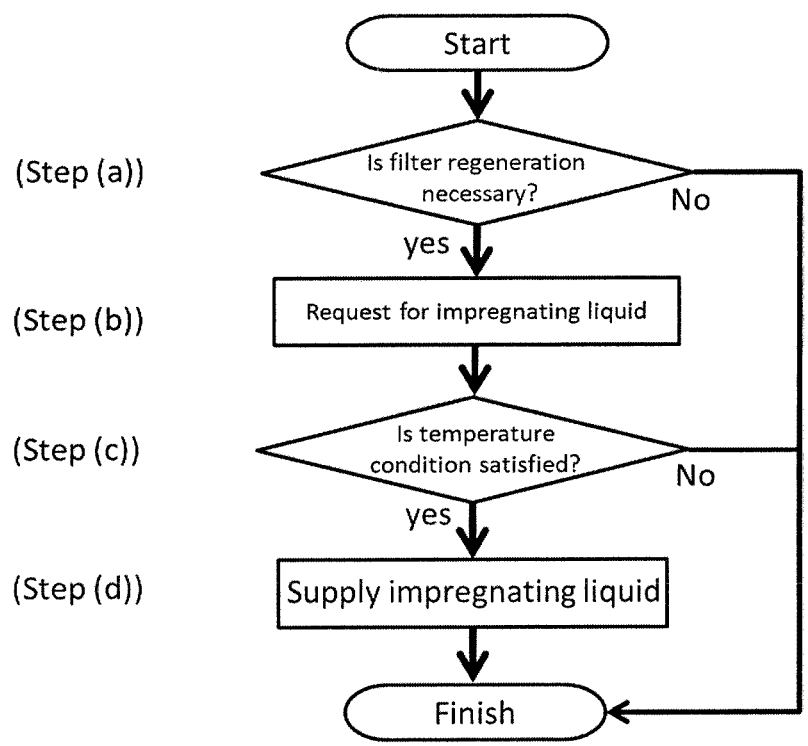
FIG. 6 is a flowchart illustrating an operation example of an automatic controller that controls a liquid supplier.

FIG. 6 is a flowchart illustrating an operation example of the automatic controller that controls the supplier of the impregnating liquid. The onboard determination system determines the necessity of filter regeneration based on the state of the soot deposited on the exhaust gas filter (step (a)). The state of the soot deposited on the exhaust gas filter can be confirmed by estimations from the weight of the filter, the pressure loss between the inlet and the outlet of the filter, the running time, the running distance, and the driving conditions, and the like. When the onboard determination system determines that regeneration is necessary, the onboard determination system executes step (b) described as below, or notifies the user of the necessity of regeneration by a warning light or the like.

If it is determined that the filter regeneration is necessary, the onboard determination system or the user requests the automatic controller to supply the impregnating liquid from the supplier to the exhaust gas filter (step (b)). At this time, the automatic controller may be configured so that the amount of liquid to be supplied to the exhaust gas filter can be further requested. When the user executes step (b), there is no particular limitation on the request method as long as a signal instructing the start of liquid supply can be transmitted to the automatic controller. For example, the automatic controller may be configured to be able to request by using a user interface such as a switch, a GUI (graphical user interface), a CUI (character user interface), a CLI (command line interface), and a microphone.

Upon receiving the request, the automatic controller determines whether the temperature measured by the temperature sensor satisfies the above-described predetermined temperature condition (step (c)).

When the automatic controller determines that the temperature condition is satisfied, it permits the impregnating liquid supplier to supply the liquid (step (d)). Specifically, the automatic controller can send a signal to open the automatic valve of the impregnating liquid supplier. At this time, the automatic controller may be configured to send a signal to close the automatic valve when a predetermined amount of the liquid is discharged from the impregnating liquid supplier, that is, to be able to supply a fixed quantity of the impregnating liquid. The discharge amount of the impregnating liquid from the supplier 16 can be monitored, for example, by installing a flow meter 13 capable of measuring the integrated amount in the impregnating liquid pipe 11, and the automatic controller 26 can stop the supply of the liquid based on the integrated amount (see FIG. 4 and FIG. 5). Since the integrated amount of the liquid discharged from the supplier 16 corresponds to the above-described "impregnation amount of liquid impregnated in the exhaust gas filter", detailed description is omitted. The same steps are performed when the user starts regeneration in response to a warning light or the like from the onboard determination system.

On the other hand, when the automatic controller determines that the temperature condition is not satisfied, it does not permit the supplier to supply the liquid. The determination is continued, and a liquid supply start command is issued when the temperature condition is satisfied. In the case where the regeneration is started by the user, the automatic controller may be configured to be able to transmit the determination result via a user interface (for example, a screen display on a display, a sound output from a speaker, or the like).

Figure 7:
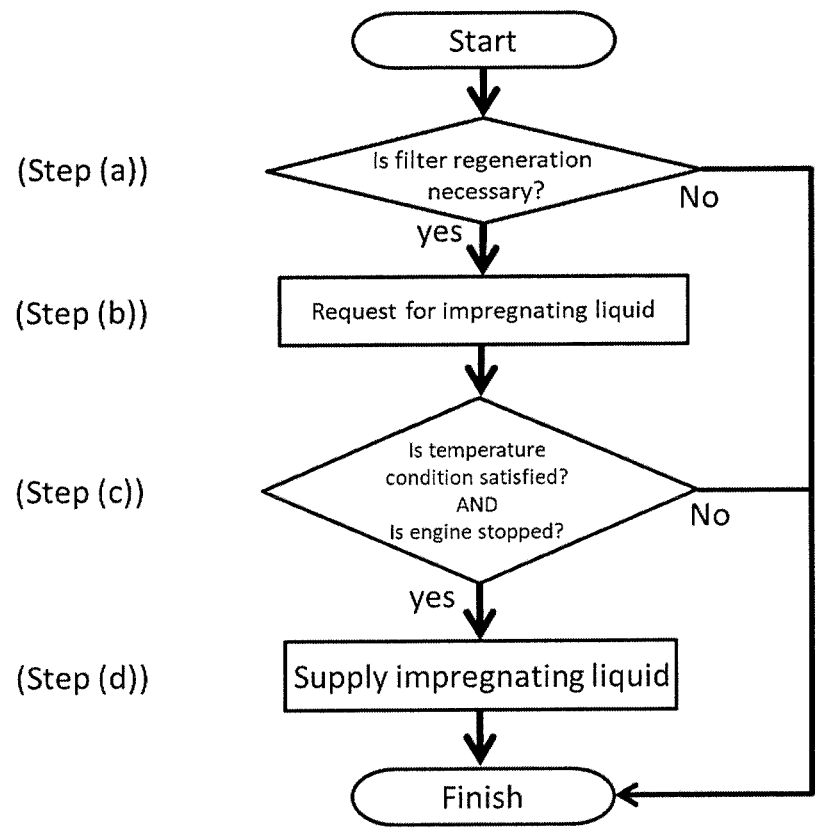
FIG. 7 is a flowchart illustrating another operation example of an automatic controller that controls a liquid supplier.

FIG. 7 is a flowchart illustrating another operation example of the automatic controller that controls the supplier of the impregnating liquid. In the present embodiment, step (a) and step (b) are the same as in the previous operation embodiment. However, in the present embodiment, the automatic controller is configured to be able to monitor the operating state of the engine (a signal indicating that the engine is operating or stopped), and the operation status of the engine is added to the criterion for determining whether to permit the supplier to supply the liquid.

Specifically, in the present embodiment, in step (c), the automatic controller is configured such that it permits the supplier to supply the liquid only when it is determined that the engine is stopped in addition to the temperature condition described above being satisfied.

Figures 1, 8:
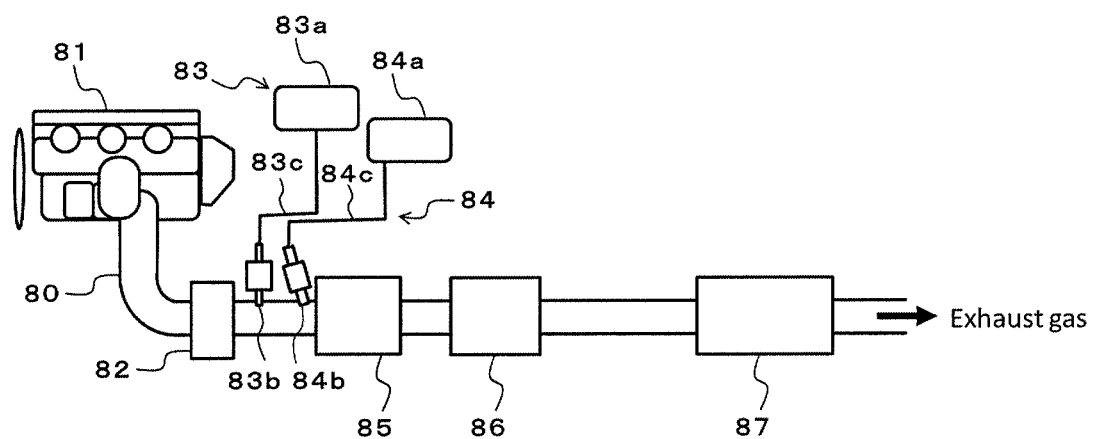
Figures 2, 8:
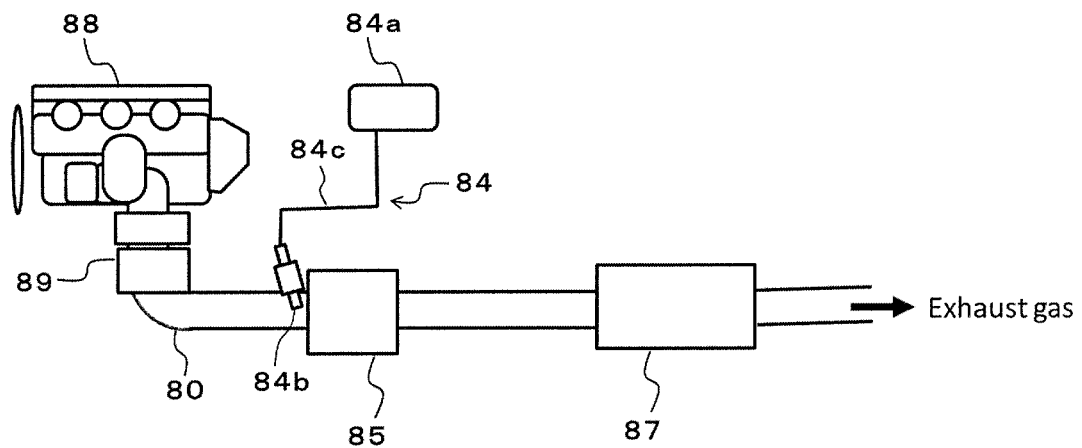
Figures 3, 8:
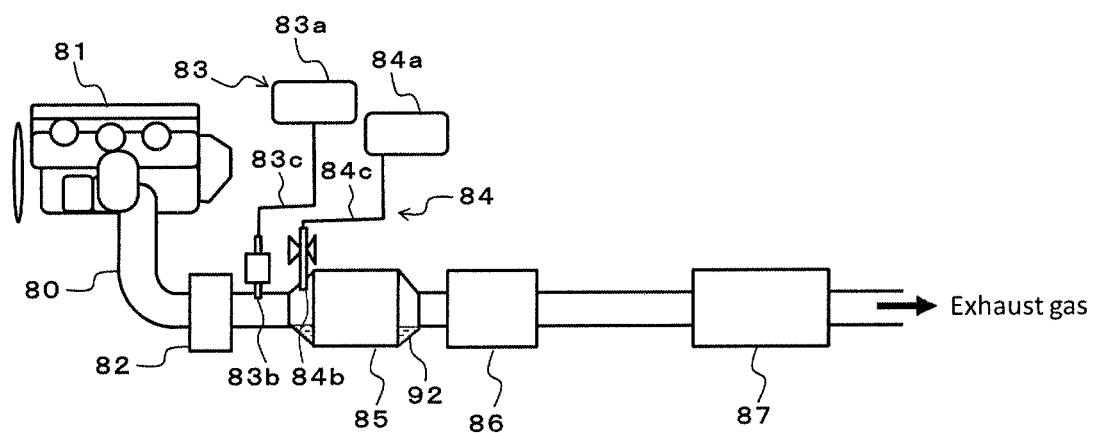
Figures 4, 8:
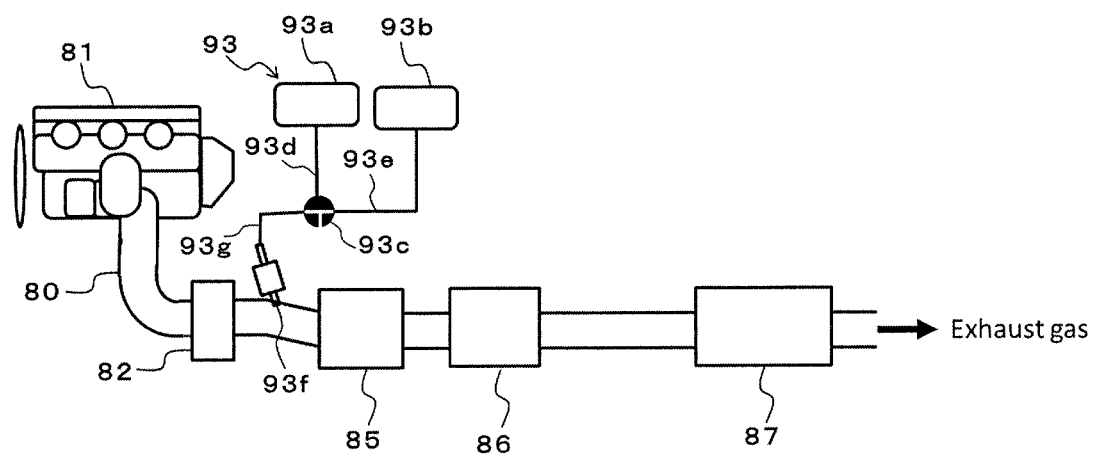
Figures 5, 8:
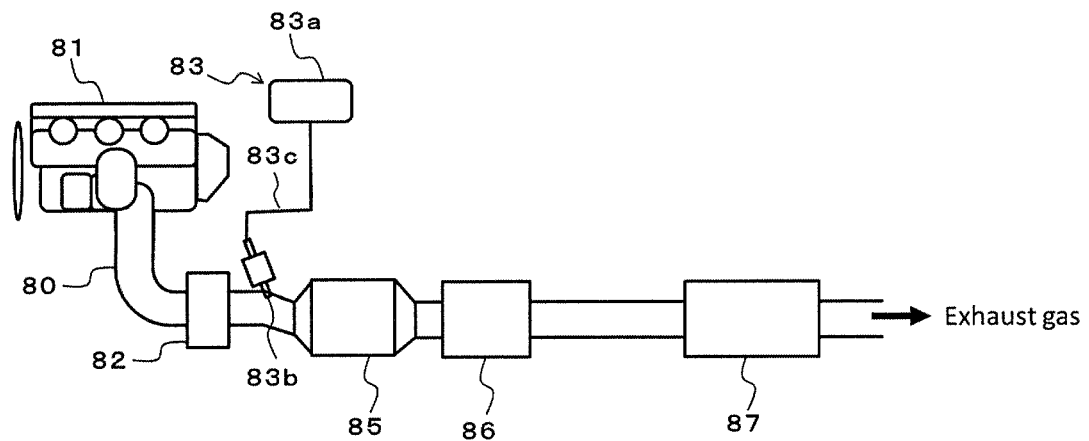
Figures 6, 8:
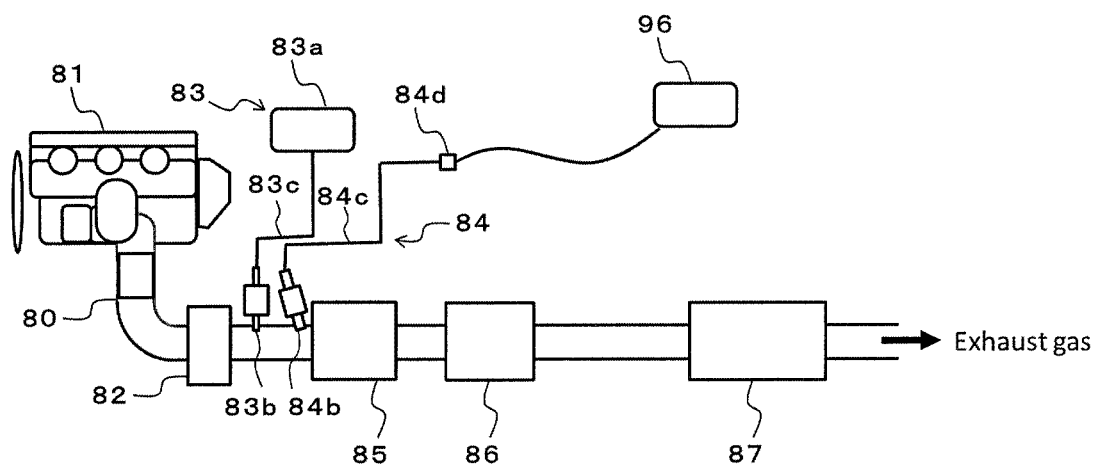
Figures 7, 8:
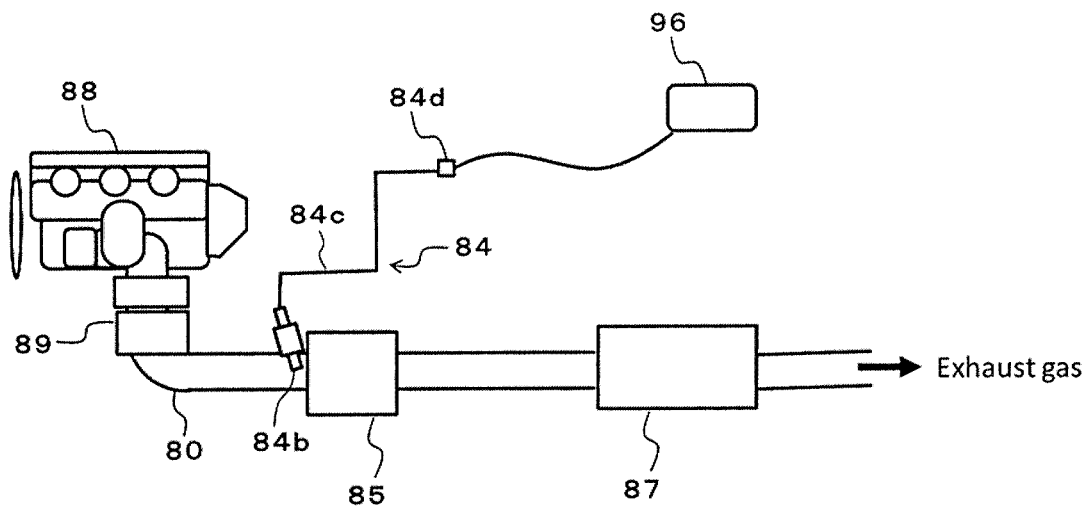
Figure 8:
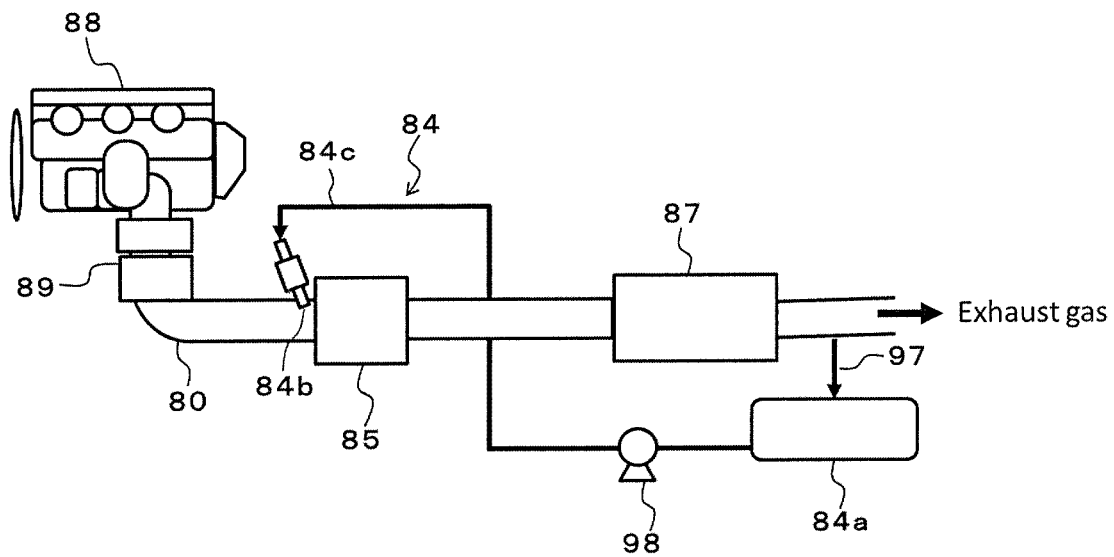

FIG. 8-1 to FIG. 8-8 are schematic diagrams of various exhaust systems equipped with the exhaust gas filter impregnation system according to one embodiment of the present invention.

In the exhaust system shown in FIG. 8-1, exhaust gas from a diesel engine 81 is discharged through an exhaust pipe 80. In the exhaust pipe 80, an oxidation catalyst 82, a urea water supplier 83, an impregnating liquid supplier 84, an exhaust gas filter 85, an SCR catalyst 86, and a muffler 87 are arranged in this order from the upstream side. The impregnating liquid supplier 84 supplies the impregnating liquid at the downstream of the oxidation catalyst 82, thereby preventing the impregnating liquid from being absorbed by the oxidation catalyst, and thus making it possible to efficiently supply the impregnating liquid to the exhaust gas filter 85. In the present embodiment, the urea water supplier 83 comprises a urea water tank 83a provided on the vehicle, and a urea water discharge port 83b connected to the urea water tank 83a via a urea water pipe 83c. In the present embodiment, the impregnating liquid supplier 84 comprises an impregnating liquid tank 84a provided on the vehicle, and an impregnating liquid discharge port 84b connected to the impregnating liquid tank 84a via an impregnating liquid pipe 84c. Further, the impregnating liquid discharged from the impregnating liquid supplier 84 is directly injected toward the exhaust gas filter 85.

In the exhaust system shown in FIG. 8-2, exhaust gas from the gasoline engine 88 is discharged through the exhaust pipe 80. In the exhaust pipe 80, a three-way catalyst 89, an impregnating liquid supplier 84, an exhaust gas filter 85, and a muffler 87 are arranged in this order from the upstream side. In the present embodiment, the impregnating liquid supplier 84 comprises an impregnating liquid tank 84a provided on the vehicle, and an impregnating liquid discharge port 84b connected to the impregnating liquid tank 84a via an impregnating liquid pipe 84c.

Figure 3:
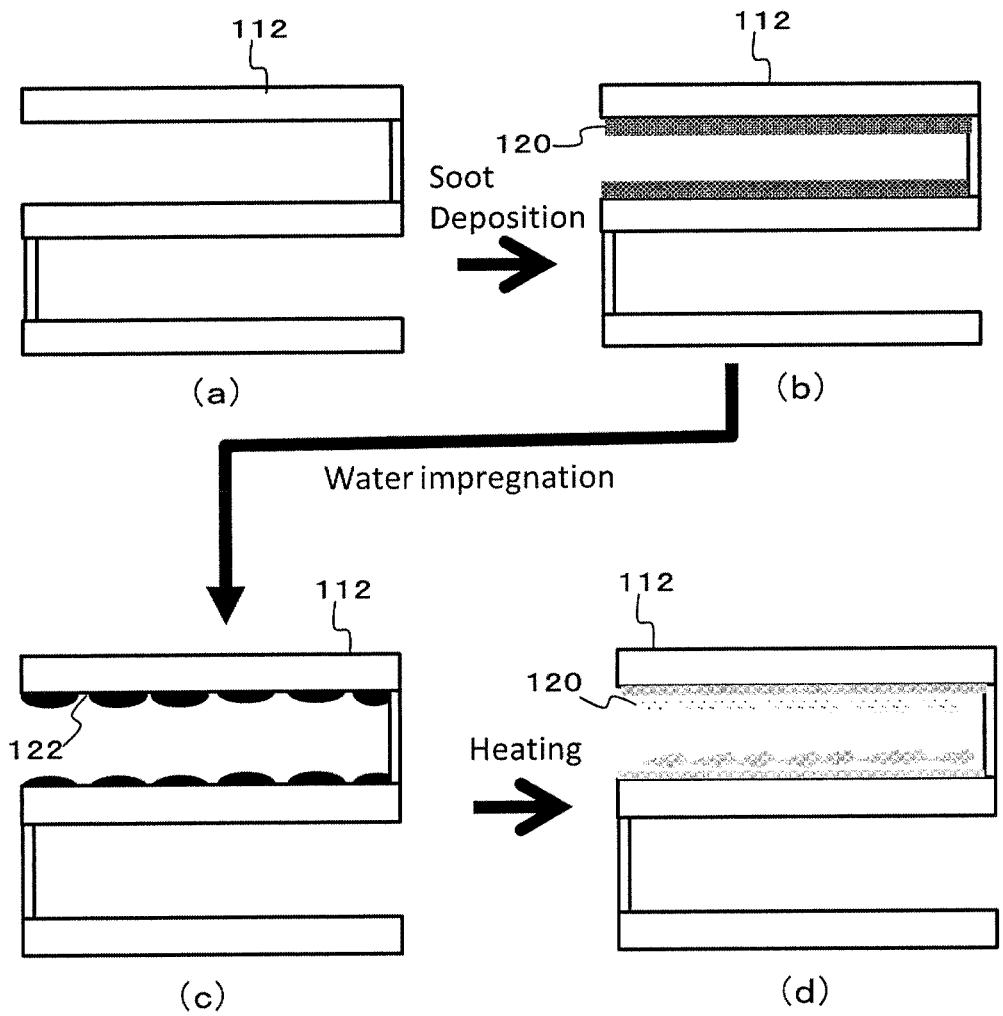
FIG. 3 is a schematic diagram for explaining a presumed principle of how soot combustion is promoted.

In the exhaust system shown in FIG. 8-3, exhaust gas from the diesel engine 81 is discharged through the exhaust pipe 80. In the exhaust pipe 80, an oxidation catalyst 82, a urea water supplier 83, an impregnating liquid supplier 84, an exhaust gas filter 85, an SCR catalyst 86, and a muffler 87 are arranged in this order from the upstream side. In the present embodiment, the urea water supplier 83 comprises a urea water tank 83a provided on the vehicle, and a urea water discharge port 83b connected to the urea water tank 83a via a urea water pipe 83c. In the present embodiment, the impregnating liquid supplier 84 comprises an impregnating liquid tank 84a provided on the vehicle, and an impregnating liquid discharge port 84b connected to the impregnating liquid tank 84a via an impregnating liquid pipe 84c. Further, the impregnating liquid discharged from the impregnating liquid supplier 84 is supplied to the liquid reservoir 92.

In the exhaust system shown in FIG. 8-4, exhaust gas from the diesel engine 81 is discharged through an exhaust pipe 80. In the exhaust pipe 80, an oxidation catalyst 82, a supplier 93 having a function of switching between urea water and impregnating liquid, an exhaust gas filter 85, an SCR catalyst 86, and a muffler 87 are arranged in this order from the upstream side. In the present embodiment, the supplier 93 with the function of switching between the urea water and the impregnating liquid comprises a urea water tank 93a provided on the vehicle, an impregnating liquid tank 93b provided on the vehicle, a switching valve 93c, a urea water pipe 93d for connecting the switching valve 93c and the urea water tank 93a, an impregnating liquid pipe 93e for connecting the impregnating liquid tank 93b with the switching valve 93c, a discharge port 93f, and a common pipe 93g for connecting the switching valve 93c and the discharge port 93f. According to the present embodiment, it is possible to selectively supply the urea water and the impregnating liquid from the discharge port 93f by switching the switching valve 93c. The present embodiment has an advantage that the piping system can be simplified. It is preferable that the direction in which the liquid is ejected at the discharge port 93f face the inlet end face of the exhaust gas filter 85. Injection may be from a plurality of outlets 93f. Further, it is preferable that the pipe connected from the position of the discharge port 93f to the inlet of the exhaust gas filter 85 be inclined downward so that the liquid supplied into the pipe flows through the pipe to the exhaust gas filter 85 side.

In the exhaust system shown in FIG. 8-5, exhaust gas from a diesel engine 81 is discharged through an exhaust pipe 80. In the exhaust pipe 80, an oxidation catalyst 82, a urea water supplier 83, an exhaust gas filter 85, an SCR catalyst 86, and a muffler 87 are arranged in this order from the upstream side. In the present embodiment, the urea water supplier 83 comprises a urea water tank 83a provided on the vehicle, and a urea water discharge port 83b connected to the urea water tank 83a via a urea water pipe 83c. In the present embodiment, there is an advantage that the piping system can be further simplified by using urea water as the impregnating liquid. It is preferable that the direction in which the liquid is ejected at the urea water discharge port 83b face the inlet end face of the exhaust gas filter 85. Injection may be from a plurality of outlets. Further, it is preferable that the pipe connected from the position of the discharge port 83b to the inlet of the exhaust gas filter 85 be inclined downward so that the liquid supplied into the pipe flows through the pipe to the exhaust gas filter 85 side.

In the exhaust system shown in FIG. 8-6, exhaust gas from a diesel engine 81 is discharged through an exhaust pipe 80. In the exhaust pipe 80, an oxidation catalyst 82, a urea water supplier 83, an impregnating liquid supplier 84, an exhaust gas filter 85, an SCR catalyst 86, and a muffler 87 are arranged in this order from the upstream side. In the present embodiment, the urea water supplier 83 comprises a urea water tank 83a provided on the vehicle, and a urea water discharge port 83b connected to the urea water tank 83a via a urea water pipe 83c. In the present embodiment, the impregnating liquid supplier 84 comprises a connecting portion 84d such as a coupling or the like for introducing the impregnating liquid from an impregnating liquid supply source 96 outside the vehicle to the supplier 84, and an impregnating liquid discharge port 84b connected to the connection portion 84d via an impregnating liquid pipe 84c. As the impregnating liquid supply source 96 outside the vehicle, for example, impregnating liquid in an impregnating liquid tank provided outside the vehicle can be used. If the impregnating liquid is water, tap water can also be used.

In the exhaust system shown in FIGS. 8-7, exhaust gas from a gasoline engine 88 is discharged through an exhaust pipe 80. In the exhaust pipe 80, a three-way catalyst 89, an impregnating liquid supplier 84, an exhaust gas filter 85, and a muffler 87 are arranged in this order from the upstream side. In the present embodiment, the impregnating liquid supplier 84 comprises a connecting portion 84d such as a coupling or the like for introducing the impregnating liquid from an impregnating liquid supply source 96 outside the vehicle to the supplier 84, and an impregnating liquid discharge port 84b connected to the connection portion 84d via an impregnating liquid pipe 84c. As the impregnating liquid supply source 96 outside the vehicle, for example, impregnating liquid in an impregnating liquid tank provided outside the vehicle can be used. If the impregnating liquid is water, tap water can also be used.

In the exhaust system shown in FIGS. 8-8, exhaust gas from a gasoline engine 88 is discharged through an exhaust pipe 80. In the exhaust pipe 80, a three-way catalyst 89, an impregnating liquid supplier 84, an exhaust gas filter 85, and a muffler 87 are arranged in this order from the upstream side. In the present embodiment, the impregnating liquid supplier 84 comprises an impregnating liquid tank 84a (water tank) and an impregnating liquid discharge port 84b connected to the impregnating liquid tank 84a via an impregnating liquid pipe 84c. In the present embodiment, a drain pipe 97 is connected to the exhaust pipe 80 on the downstream side of the muffler 87, and water condensed in the low-temperature portion in the exhaust pipe 80 is collected in the impregnating liquid tank 84a through the drain pipe 97. A pump 98 may be provided in the midway of the impregnating liquid pipe 84c to send the impregnating liquid from the impregnating liquid tank 84a to the impregnating liquid discharge port 84b.

In addition, the supply amount and supply timing of the urea water can be controlled by a publicly known automatic controller. However, the urea water is supplied to the exhaust gas flow path for the purpose of $NO_x$ removal when the exhaust gas temperature reaches several hundred degrees. For this reason, even if the urea water is introduced into the exhaust gas flow path, it is immediately vaporized and cannot be attached to the exhaust gas filter as a liquid. That is, even if a system for supplying the urea water is conventionally mounted on a vehicle, the exhaust gas filter cannot be impregnated with urea water by the conventional method of using the urea water.

EXAMPLES

Examples for better understanding the present invention and its advantages will be described below, but the present invention is not limited to the examples.
(1. Preparation of Exhaust Gas Filter)
DPFs with the following specifications were prepared for each filter regeneration test.
Material: Made of Si—SiC (silicon-silicon carbide composite material)
Shape: cylindrical
Dimensions: 165 mm in diameter×140 mm in height (volume: 3 L)
Density of cells: 46.5 cells/cm$^2$
Partition wall thickness: 0.305 mm Cell shape (cross-sectional shape of the cell in a cross-section perpendicular to the cell length direction): square
Porosity of partition walls: 63%
Catalyst: SCR catalyst coat layer was formed on partition walls
Structure: Wall flow type honeycomb structure (2. Deposition of PM)

The DPF was installed in the exhaust system of a diesel engine, and the engine was operated until 24 g of PM was deposited on the DPF. The PM deposition weight was determined from the difference between the filter weight measured before the PM deposition operation and the filter dry weight after the PM deposition operation.

(3. Filter Regeneration Test)

<Test No. 1 to 3: Inventive Examples>

400 cc of water (liquid temperature: 25° C.) was supplied at an ambient temperature of 25° C. into the can of the DPF on which PM containing soot had been deposited by the above procedure so that the liquid water accumulated on the lower side of the space inside the can, and left for 5 minutes to allow impregnation by capillary phenomenon. The impregnation amount was about 0.13 L per 1 L of the volume of the DPF. The impregnation amount was confirmed by measuring the weight of the DPF before and after the impregnation.

A filter regeneration test was performed by flowing an engine exhaust gas having an oxygen concentration of 8% by volume at a flow rate of 2.3 $Nm^3$/min to the DPF after impregnation for a regeneration time shown in Table 1. At this time, the gas temperature at the inlet of the DPF was changed as shown in Table 1 according to the test number.

<Test No. 4 to 9: Comparative Examples>

An engine exhaust gas having an oxygen concentration of 8% by volume was flowed at a flow rate of 2.3 $Nm^3$/min to the DPF on which PM containing soot had been deposited by the above procedure for a regeneration time shown in Table 1, without impregnating the DPF with water. A filter regeneration test was performed. At this time, the gas temperature at the inlet of the DPF was changed as shown in Table 1 according to the test number.

(4. Measurement of Pressure Loss at Start of Regeneration)

In the above filter regeneration test, the pressure loss between the inlet and the outlet of the DPF at the start of filter regeneration was measured. The results are shown in Table 1.

(5. Measurement of Regeneration Efficiency)

In the filter regeneration test, the regeneration efficiency of the filter was measured. The regeneration efficiency of the filter was measured by a method of measuring the dry weight of the filter before and after the regeneration. The results are shown in Table 1.

To determine the regeneration efficiency, the weight of the filter without soot deposited, the weight of the filter with soot deposited before regeneration, and the weight of the filter after regeneration were each measured at a dry state by drying them at 200° C. for 1 hour or more to evaporate the water in the catalyst.

TABLE 1

| Test No. | Amount of water absorption cc | Inlet gas temperature ° C. | Regeneration time min | Regeneration efficiency % | Pressure loss at start of regeneration kPa |
|---|---|---|---|---|---|
| 1 | 400 | 560 | 5 | no less than 99 | 3.5 |
| 2 | 400 | 600 | 5 | no less than 99 | 3.9 |
| 3 | 400 | 650 | 5 | no less than 99 | 4.5 |
| 4 | 0 | 560 | 20 | 36 | 8 |
| 5 | 0 | 600 | 20 | 52 | 8.4 |
| 6 | 0 | 650 | 20 | 65 | 8.9 |
| 7 | 0 | 560 | 5 | 9 | 8 |
| 8 | 0 | 600 | 5 | 13 | 8.4 |
| 9 | 0 | 650 | 5 | 17 | 8.9 |

(6. Discussion)

From Table 1, it was found that test No. 1 to 3 in which filter regeneration was performed after impregnating the DPF with liquid water have achieved a filter regeneration efficiency of 99% in a regeneration time of only 5 minutes even at a low inlet gas temperature of 560° C. Further, in test No. 1 to 3, it can be found that the pressure loss at the start of regeneration was reduced because the soot deposition layer was condensed to form pores by impregnating the DPF with water. On the other hand, in test No. 7 to 9, since the DPF was not impregnated with water, the obtained regeneration efficiency was only 17% in a regeneration time of 5 minutes even at an inlet gas temperature of 650° C. Further, from the results of test No. 4 to 6, it can be found that when the DPF was not impregnated with water, the regeneration efficiency was still low even if the regeneration time was extended to 20 minutes.

DESCRIPTION OF REFERENCE NUMERALS

11 Impregnating liquid pipe
12 Exhaust gas flow path
13 Flow meter
14 Enlarged diameter portion
15 Temperature sensor
16 Impregnating liquid supplier
18 Discharge port
19 Automatic valve
20 Nozzle
22 Mat
24 Liquid Reservoir
26 Automatic controller
27 Onboard determination system
81 Diesel engine
80 Exhaust pipe
82 Oxidation catalyst
83 Urea water supplier
83*a* Urea water tank
83*b* Urea water discharge port
83*c* Urea water pipe
84 Impregnating liquid supplier
84*a* Impregnating liquid tank
84*b* Impregnating liquid discharge port
84*c* Impregnating liquid pipe
84*d* Connecting portion
85 Exhaust gas filter
86 SCR catalyst
87 Muffler
88 Gasoline engine
89 Three way catalyst
92 Liquid reservoir
93 Supplier with function of switching between urea water and impregnating liquid
93*a* Urea water tank 93b Impregnating liquid tank
93c Switching valve
93d Urea water pipe
93e Impregnating liquid pipe
93f Discharge port
93g Common pipe
96 Impregnating liquid supply source outside vehicle
97 Drain pipe
98 Pump
100 Exhaust gas filter
102 Outer peripheral side wall
104 First end face
106 Second end face
108 First cell
110 Second cell
112 Partition wall
120 soot
122 pore

The invention claimed is:

1. A method for regenerating an exhaust gas filter on which soot is deposited, comprising sequentially conducting:
   a step 1 of impregnating the filter with a liquid having 50% by mass or more of a component having a boiling point of 550° C. or less when an ambient temperature in the filter is at least 40° C. lower than the boiling point;
   a step 2 of raising the ambient temperature in the filter after the impregnation to a temperature equal to or higher than the boiling point of the component; and
   a step 3 of supplying an oxygen-containing gas at a temperature exceeding 550° C. to the filter to burn the soot.

2. The method for regenerating an exhaust gas filter according to claim 1, wherein the step 1 is conducted when the ambient temperature in the filter is at least 60° C. lower than the boiling point.

3. The method for regenerating an exhaust gas filter according to claim 1, wherein the component having the boiling point of 550° C. or less is water.

4. The method for regenerating an exhaust gas filter according to claim 3, wherein the liquid comprises urea.

5. The method for regenerating an exhaust gas filter according to claim 1, wherein in the step 1, an amount of the liquid impregnated in the filter is set to be 0.05 L or more and 1 L or less per 1 L of the volume of the filter.

6. The method for regenerating an exhaust gas filter according to claim 1, wherein the exhaust gas filter is a vehicle exhaust gas filter.

7. The method for regenerating an exhaust gas filter according to claim 6, wherein the liquid is supplied from outside the vehicle.

8. The method for regenerating an exhaust gas filter according to claim 1, wherein the exhaust gas filter comprises:
   an outer peripheral side wall;
   a plurality of first cells disposed inside the outer peripheral side wall, extending from a first end face to a second end face, the first end face being open and the second end face being plugged; and
   a plurality of second cells disposed inside the outer peripheral side wall, extending from the first end face to the second end face, the first end face being plugged and the second end face being open, and
   wherein the exhaust gas filter has a structure in which the first cells and the second cells are alternately arranged adjacent to each other with porous partition walls interposed therebetween.

9. The method for regenerating an exhaust gas filter according to claim 1, wherein the filter does not comprise an oxidation catalyst.

10. An exhaust gas filter impregnation system, comprising:
    an exhaust gas filter placed in an exhaust gas flow path;
    a supplier for supplying a liquid comprising urea having 50% by mass or more of a component having a boiling point of 550° C. or less to the exhaust gas filter;
    a temperature sensor placed in the exhaust gas flow path; and
    an automatic controller that permits the supplier to perform supply of the liquid comprising urea when a temperature measured by the temperature sensor is at least 40° C. lower than the boiling point.

11. The exhaust gas filter impregnation system according to claim 10, wherein the supplier is capable of directly injecting the liquid comprising urea toward the exhaust gas filter.

12. The exhaust gas filter impregnation system according to claim 10, wherein the exhaust gas filter is placed in a liquid reservoir provided in the exhaust gas flow path, and the supplier is capable of supplying the liquid comprising urea to the liquid reservoir.

13. The exhaust gas filter impregnation system according to claim 10, wherein the supplier is provided on an upstream side of the exhaust gas filter.

14. The exhaust gas filter impregnation system according to claim 10, wherein the supplier supplies the liquid comprising urea at a downstream of an oxidation catalyst provided in the exhaust gas flow path.

15. The exhaust gas filter impregnation system according to claim 10, wherein the automatic controller permits the supplier to perform supply of the liquid comprising urea when a temperature measured by the temperature sensor is at least 60° C. lower than the boiling point.

16. The exhaust gas filter impregnation system according to claim 10, wherein the component having the boiling point of 550° C. or less is water.

17. The exhaust gas filter impregnation system according to claim 10, wherein the automatic controller is capable of giving instruction to the supplier to quantitatively supply an amount of the liquid comprising urea of 0.05 L or more and 1 L or less per 1 L of the volume of the filter.

18. The exhaust gas filter impregnation system according to claim 10, wherein the exhaust gas filter is a vehicle exhaust gas filter.

19. The exhaust gas filter impregnation system according to claim 10, wherein the exhaust gas filter comprises:
    an outer peripheral side wall;
    a plurality of first cells disposed inside the outer peripheral side wall, extending from a first end face to a second end face, the first end face being open and the second end face being plugged; and
    a plurality of second cells disposed inside the outer peripheral side wall, extending from the first end face to the second end face, the first end face being plugged and the second end face being open, and
    wherein the exhaust gas filter has a structure in which the first cells and the second cells are alternately arranged adjacent to each other with porous partition walls interposed therebetween.

20. The exhaust gas filter impregnation system according to claim 10, wherein the filter does not comprise an oxidation catalyst.

21. The exhaust gas filter impregnation system according to claim 10, wherein the supplier comprises a water tank for collecting and storing liquid water generated by condensation of water vapor in the exhaust gas.

22. The exhaust gas filter impregnation system according to claim 10, wherein the exhaust gas filter impregnation system is mounted on a vehicle, and comprises a connection portion for supplying the liquid comprising urea to the supplier from outside the vehicle.

* * * * *